UNITED STATES PATENT OFFICE.

FRITZ ULLMANN, OF BERLIN, GERMANY, ASSIGNOR TO ACTIEN GESELLSCHAFT FÜR ANILIN FABRIKATION, OF BERLIN, GERMANY.

ANTHRAQUINONE-DI-ACRIDONES.

961,048. Specification of Letters Patent. Patented June 7, 1910.

No Drawing. Application filed February 23, 1910. Serial No. 545,329.

*To all whom it may concern:*

Be it known that I, FRITZ ULLMANN, subject of the King of Bavaria, residing at Berlin, Germany, my post-office address being Schwäbischestrasse 8, Berlin W. 30, have invented certain new and useful Improvements in New Dyestuffs of the Anraquinone Series (Anthraquinone-di-Acridones) and Processes of Making Same, of which the following is a specification.

My present invention relates to new vat dyestuffs of the anthraquinone series which are to be called anthraquinone-di-acridones, the simplest dyestuff of this class having the formula:

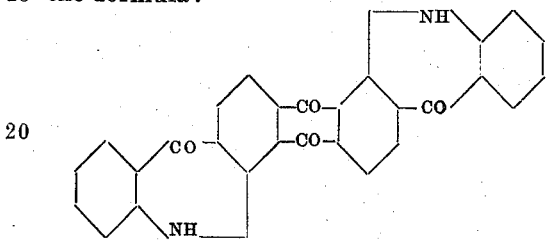

I may obtain these new products by eliminating water from 1.5-dianilido-anthraquinone-dicarboxylic acids of the general formula:

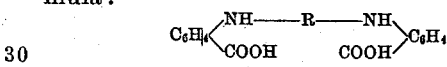

in which formula R represents an anthraquinone residue or a substituted anthraquinone residue. Thus for instance I use as parent-material for my process the 1.5-dianilido-anthraquinone-dicarboxylic acid:

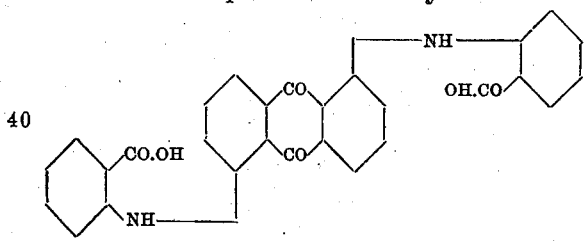

which may be obtained by acting with 1.5-dichloro-anthraquinone upon anthranilic acid.

The elimination of water from the parent-materials may be effected by the action of a suitable dehydrating agent, for instance by warming the acids with concentrated sulfuric acid, or by transforming the respective carboxylic acid into the corresponding acid chlorid and treating these chlorids with aluminium-chlorid.

The following example serves to illustrate my invention, the parts being by weight: 128 parts of 1.5-dianilido-anthraquinone-dicarboxylic acid, 200 parts of phosphorous pentachlorid are heated on the water-bath until the evolution of hydrochloric acid ceases. The mass is then diluted with benzene and 100–200 parts of anhydrous aluminium-chlorid are added, whereupon hydrochloric acid again evolves, the mass assuming a green color. The reaction being performed, the mass is decomposed by adding ice and hydrochloric acid and the benzene distilled away by steam, the product of reaction remaining thus as a dark blue powder which is isolated by filtering, washing with water and drying. The dyestuff thus obtained forms a dark blue powder which dissolves in concentrated sulfuric acid to a red yellow solution. It is insoluble in alcohol and ether, but soluble in anilin on heating to a violet colored solution. This coloring matter produces on cotton from a vat, prepared by means of a salt of hydrosulfurous acid and an alkali very fast blue-violet tints.

It is obvious to those skilled in the art that my present invention is not limited to the foregoing example or to the details given therein. For instance in using the carboxylic acids directly for splitting off water instead of concentrated sulfuric acid named above any dehydrating agent suitable for my process may be employed.

Having now described my invention and the manner in which it may be carried out, what I claim is,—

As a new article of manufacture the hereinbefore described new dyestuff of the anthraquinone-series being anthraquinone-di-2.1-acridone, having the formula:

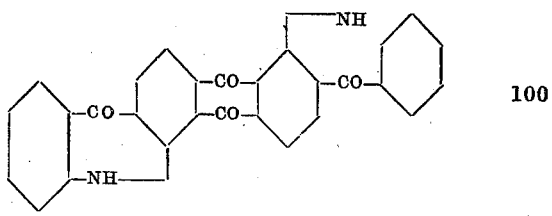

which coloring matter may be obtained by the action of a dehydrating agent upon 1.5-dianilido-anthraquinone-dicarboxylic acid and which new dyestuff in the dry state forms a dark blue powder which dissolves in concentrated sulfuric acid to a red-yellow solution and which new coloring matter is insoluble in alcohol and ether but soluble in anilin on heating to a violet colored solution, and which new dyestuff forms with a salt of hydrosulfurous acid and an alkali a blue vat, from which cotton is dyed a very fast blue-violet tint.

In testimony whereof I have hereunto set my hand in presence of two subscribing witnesses.

FRITZ ULLMANN.

Witnesses:
HENRY HASPER,
WOLDEMAR HAUPT.